(12) United States Patent
Olliges et al.

(10) Patent No.: US 6,659,225 B2
(45) Date of Patent: Dec. 9, 2003

(54) STAIRWAY FOR ENABLING ACCESS TO AN OVERHEAD AREA WITHIN A FUSELAGE OF AN AIRCRAFT

(75) Inventors: Michael J. Olliges, Bothell, WA (US); Gary D. Reysa, Bozeman, MT (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/951,128

(22) Filed: Sep. 13, 2001

(65) Prior Publication Data

US 2003/0168281 A1 Sep. 11, 2003

(51) Int. Cl.[7] .............................................. E06C 9/00
(52) U.S. Cl. ...................................... 182/97; 244/118.5
(58) Field of Search ............................. 182/93, 38, 97, 182/115, 48, 39, 106, 116; 244/129.6, 118.5, 137.2; D34/30; 14/71.3, 69.5; 52/182, 183, 187, 188, 184–186

(56) References Cited

U.S. PATENT DOCUMENTS

| | | | |
|---|---|---|---|
| D147,745 S | * 10/1947 | Dorrler | ................ 244/118.5 X |
| 3,670,848 A | * 6/1972 | Raiguel, Jr. | .................. 182/115 |
| 4,053,140 A | * 10/1977 | Clemens et al. | ............... 256/19 |
| 4,315,389 A | * 2/1982 | Loix | ........................... 52/185 |
| 5,299,653 A | * 4/1994 | Nebel | ...................... 182/141 X |
| 5,395,075 A | 3/1995 | Sprenger et al. | |
| 6,003,813 A | 12/1999 | Wentland et al. | |
| 6,152,400 A | 11/2000 | Sankrithi et al. | |
| 6,390,325 B1 | * 5/2002 | Gonzales | ................. 220/567.2 |

FOREIGN PATENT DOCUMENTS

JP      6288052      * 10/1994      .................. 52/182

* cited by examiner

*Primary Examiner*—Hugh B. Thompson
(74) *Attorney, Agent, or Firm*—Harness Dickey & Pierce P.L.C.

(57) ABSTRACT

A stairway module for use within a fuselage of an aircraft for enabling access to an overhead storage or sleeping area within the aircraft. One preferred embodiment discloses a spiral stairway module having a footprint no larger than a standard lavatory module. Another embodiment includes a stairway module having a pivotally mounted stair section which can be moved between operable and inoperable positions. Both embodiments provide a mid-level platform changing area. All of the embodiments are extremely compact and allow either fore-to-aft access or athwartship access to the overhead sleeping or storage area in the fuselage of the aircraft.

11 Claims, 5 Drawing Sheets

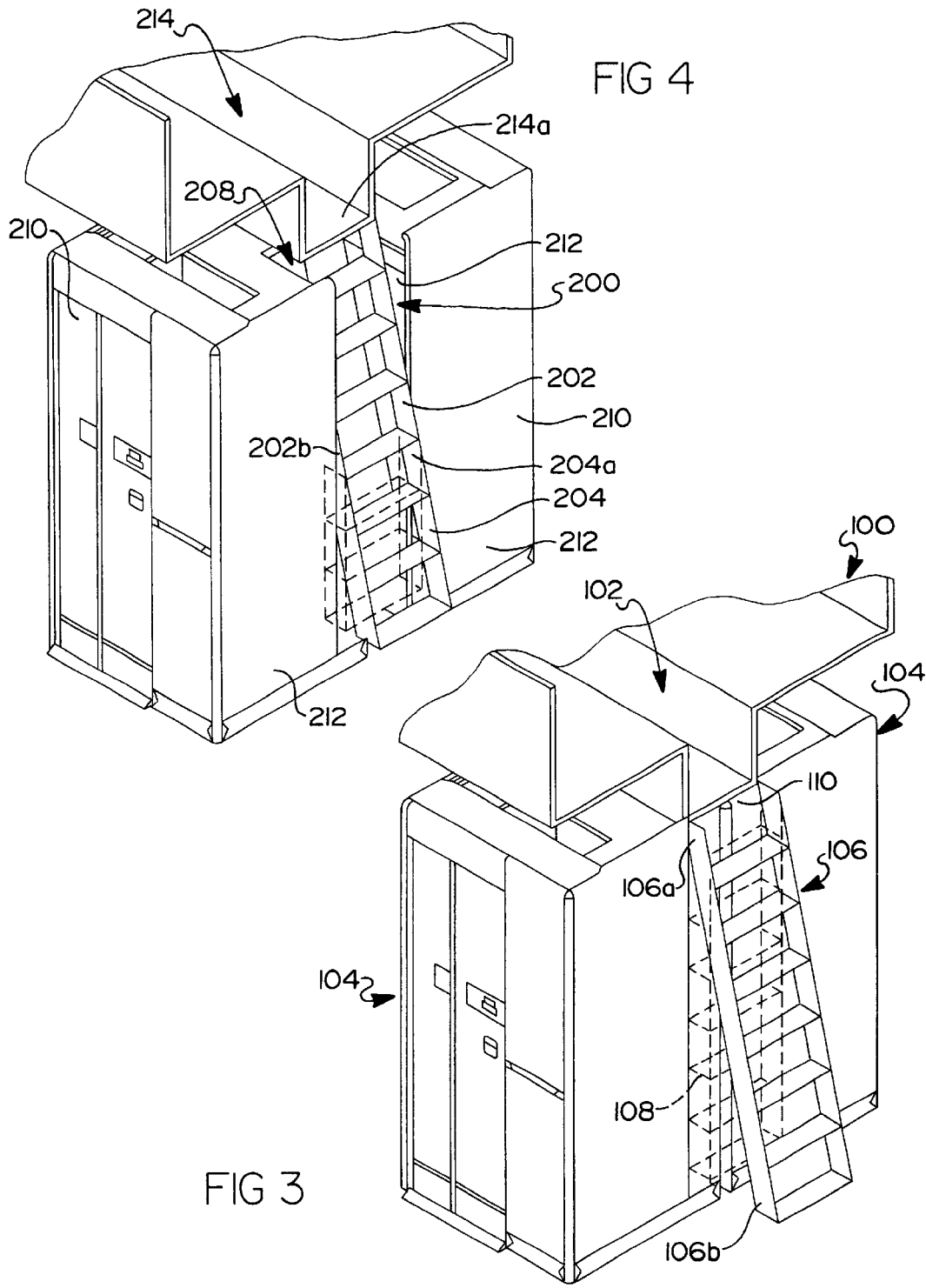

STAIRWAY FOR ENABLING ACCESS TO AN OVERHEAD AREA WITHIN A FUSELAGE OF AN AIRCRAFT

FIELD OF THE INVENTION

The present invention relates to stairway systems used in aircraft, and particularly to a stairway system used within a commercial aircraft to enable access to an overhead area, such as a sleeping or storage area, within a fuselage of the aircraft, and wherein the stairway is extremely compact and requires only a minimal footprint area within the fuselage.

BACKGROUND OF THE INVENTION

Stairway systems are used within aircraft to enable access to overhead areas, such as sleeping or storage areas, within the fuselage of the aircraft. However, many previously developed stairways have a large footprint. In commercial aircraft, where space is at a premium, it is extremely important to minimize the footprint of such a stairway.

Ideally, a stairway used within a fuselage of a commercial aircraft would have a footprint as small as possible, without compromising the design of the stairway and making it difficult for a crew member to climb up and down the stairway. Preferably, in one embodiment, the stairway could be integrated between two lavatory modules in such a manner so as to minimize the physical intrusion of the stairway into the interior area of each lavatory module, and thus provide a "zero" footprint when the stairway is not in use. In another embodiment, it would be highly desirable to provide a stairway which has a footprint no greater than that of one lavatory module. Such a stairway design would ensure that the stairway does not interfere with the aisleway, or aisleways, in an aircraft.

SUMMARY OF THE INVENTION

The present invention is directed to a stairway system in accordance with preferred embodiments of the present invention. In a first preferred embodiment, the stairway system includes a first (i.e., upper) stairway section and a second (i.e., lower) stairway section. The first and second stairway sections are separated by a mid-level platform area. The mid-level platform area can be used as a changing area for crew members. The second stairway section is also pivotally mounted such that it can be pivoted so that the lower end thereof extends outwardly, thus placing the second stairway section at an incline allowing a crew member to walk up and down it easily. When the second a stairway section is moved into a retracted position, the lower end thereof is moved into a position generally flush with a wall panel of the stairway module disposed adjacent the second stairway section. An area underneath the mid-level platform allows room for storing galley carts. This stairway module has a footprint about the same as a conventional lavatory module.

In a second alternative preferred embodiment, a stairway module is provided for enabling access to an overhead sleeping or storage area. The module has a first (i.e, upper) stairway section separated from a second (i.e., lower) stairway section by a mid-level changing area. The second stairway section is orientated 90° from the first stairway section and is not movable. This module also provides room for storage of at least one galley cart underneath the area of the mid-level platform. The stairway sections of this module thus form a "spiral" stairway for athwartship access to overhead storage or sleeping areas of the fuselage.

In a third alternative preferred embodiment, the stairway system of the present invention incorporates a single linear stairway section which is integrated into, and inbetween, a pair of lavatory modules. Each of the lavatory modules includes cut out sections which provide a space for storing the stairway section therein when the stairway section is not in use. The stairway section is attached at its upper end such that its lower end can be pivoted out away from the lavatory modules to place the stairway section in an operable position. Climbing up the stairway section thus allows the user (i.e., crew member) access to overhead areas such as those used for storage and/or sleeping. With this embodiment, the access to the overhead area is fore-to-aft along the fuselage.

In another alternative preferred embodiment, the stairway section of the first embodiment described above is divided into two sections: an upper section and a lower section. The upper end of the lower section is pivotally coupled to the lower end of the upper section. When the stairway section is to be used, the lower end is pivoted out into an operative position. The upper section is disposed fixedly at an incline (i.e., operative position).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a perspective view of a third stairway module in accordance with another alternative preferred embodiment of the present invention wherein a single elongated stairway section is incorporated and hinged pivotally at an upper end to permit the stairway section to be moved between operative and inoperative positions;

FIG. 4 is a perspective view of a fourth stairway module in accordance with another alternative preferred embodiment of the present invention in which the stairway section of FIG. 3 has been split into upper and lower stairway sections, with the lower stairway section being pivotally mounted and movable between inoperative and operative positions.

DETAILED DESCRIPTION OF THE PREFERRED EMBODIMENTS

The following description of the preferred embodiment(s) is merely exemplary in nature and is in no way intended to limit the invention, its application, or uses.

Figure 1:
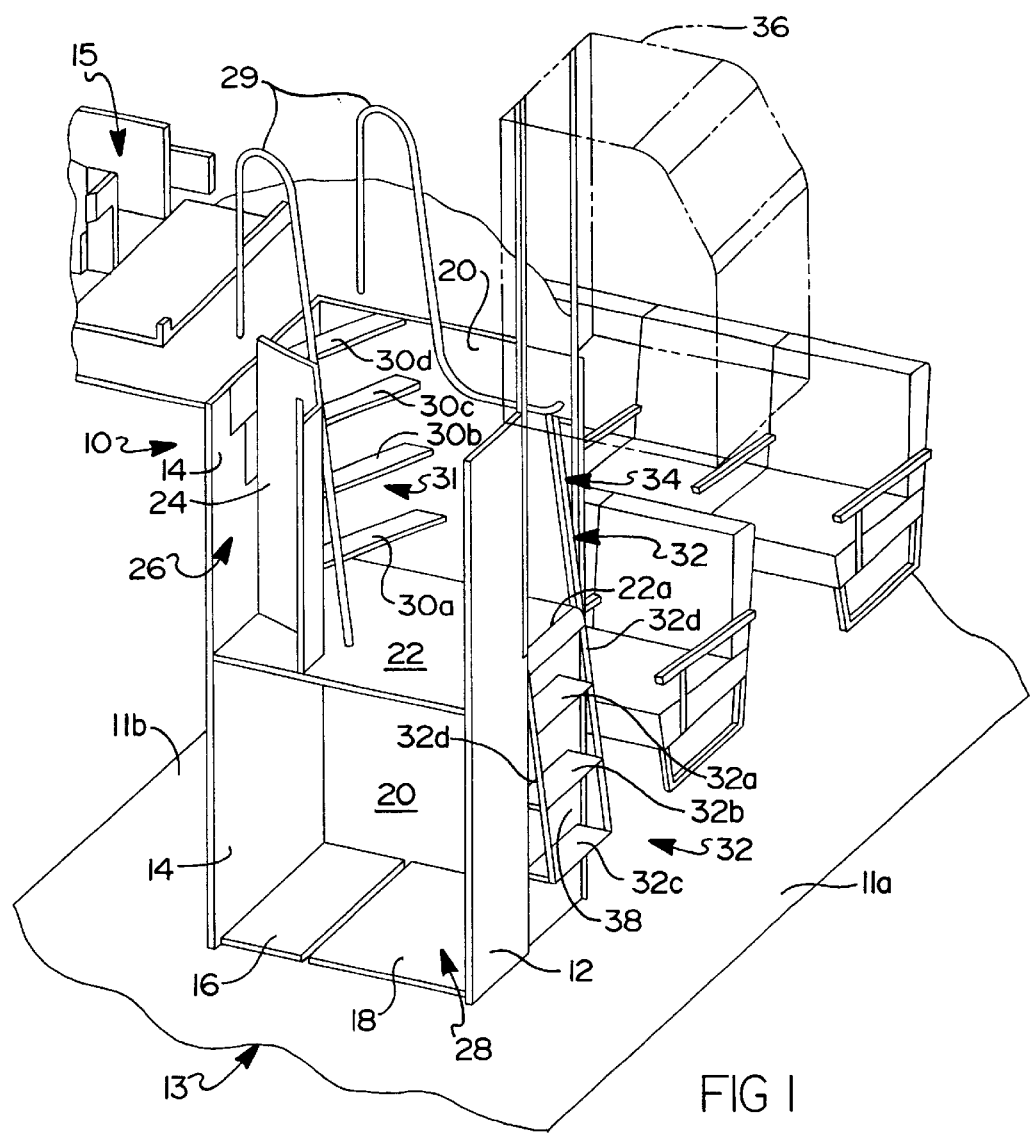
FIG. 1 is a perspective view of a first stairway module in accordance with a preferred embodiment of the present invention in which a lower, pivotable stairway section is incorporated.

Referring to FIG. 1, there is shown a stairway module 10 for an aircraft in accordance with a first preferred embodiment of the present invention. The stairway module 10 includes athwartship walls 12 and 14, floor panels 16 and 18, a rear wall 20 and a mid-level changing platform 22. A wall 24 disposed on the mid-level changing platform 22 partially defines a small storage area 26. Area 28 can be used to store galley carts. The module 10 is intended to reside between isleways 11a and 11b in the fuselage 13 of an aircraft. The module 10 provides access by crew members to an overhead sleeping or storage area 15.

Above the mid-level changing platform 22 are disposed four steps 30a–30d which are fixedly supported between walls 14 and 20. Hand rails 29 help the crew member climb up and down on the steps 30. Steps 30 form an upper or first stairway section 31. A second stairway section 32 is formed by three steps 32a, 32b and 32c together with a pair of frame rails 32d. Frame rails 32d are pivotally coupled at an edge 22a of the mid-level changing platform 22. Pushing in the direction of arrow 34 causes a lower end (i.e., step 32d) to be urged outwardly into an operable position. Pulling the frame members 32d at their upper ends in a direction opposite to arrow 34 causes the lower end to be retracted into a position flush with wall portion 12. When in the retracted position, the encroachment into the interior area 28 is minimal and the lower end of frame members 32d rest flush with wall 12.

The entire stairway module 10 has a footprint no larger than a standard lavatory module. The stairway module 10 can also be easily interfaced with a second overhead storage area 36 in which a crew member standing on the mid-level changing platform 22 can easily access. The compactness of the stairway module 10 eliminates interference in the aisleways 11a and 11b adjacent to the lower stairway section 32 when stairway section 32 is in its retracted (i.e., inoperable) position.

Figure 1A:
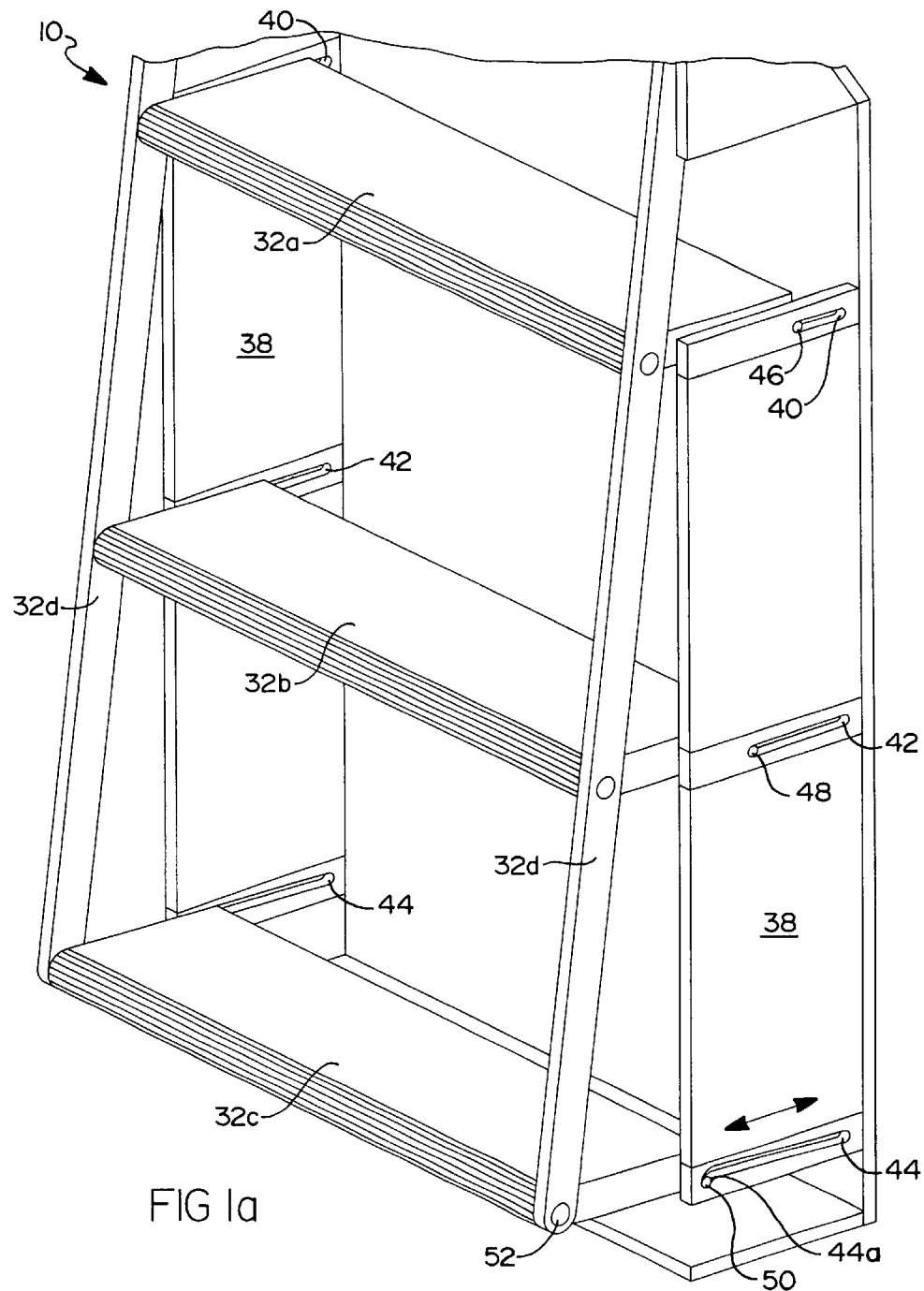
FIG. 1a is a perspective view of just a lower portion of the stairway section of FIG. 1 and its supporting wall structure.

It will be appreciated that the frame rails 32d are associated with a suitable structure to prevent the lower stairway section 32 from inadvertently moving into its retracted position while a crew member is standing on one of the steps 32a–32c. Referring to FIG. 1a, panels 38 disposed on opposite longitudinal sides of the stairway section 32 support the steps 32a–32c. The panels 38 are supported adjacent wall portions 20 and 12 of FIG. 1, but have been omitted in FIG. 1 to avoid cluttering the drawing.

Each of the panels 38 includes a plurality of slots 40, 42 and 44. The slots 40, 42 and 44 each allow a respective support pin 46, 48 and 50 associated with steps 32a, 32b and 32c, respectively, to move linearly therealong when the stairway section 32 is moved into its operative position. The lowermost step 32c is further pivotally mounted at point 52 to each of the rails 32d. When the stairway section 32 is moved into it operative position, as shown in FIGS. 1 and 1a, the support pins 50 at each longitudinal end of the bottom step 32c drop into a lower, forwardmost portion 44a of each slot 44. This prevents the step 32c from being inadvertently retracted during use. To retract the stairway section 32, the bottom step 32c is lifted along its rear edge 54, which causes support pins 50 to be lifted out of forwardmost portions 44a of the slots. While held in this position, the bottom step 32c can then be pushed into its retracted position.

Figure 2:
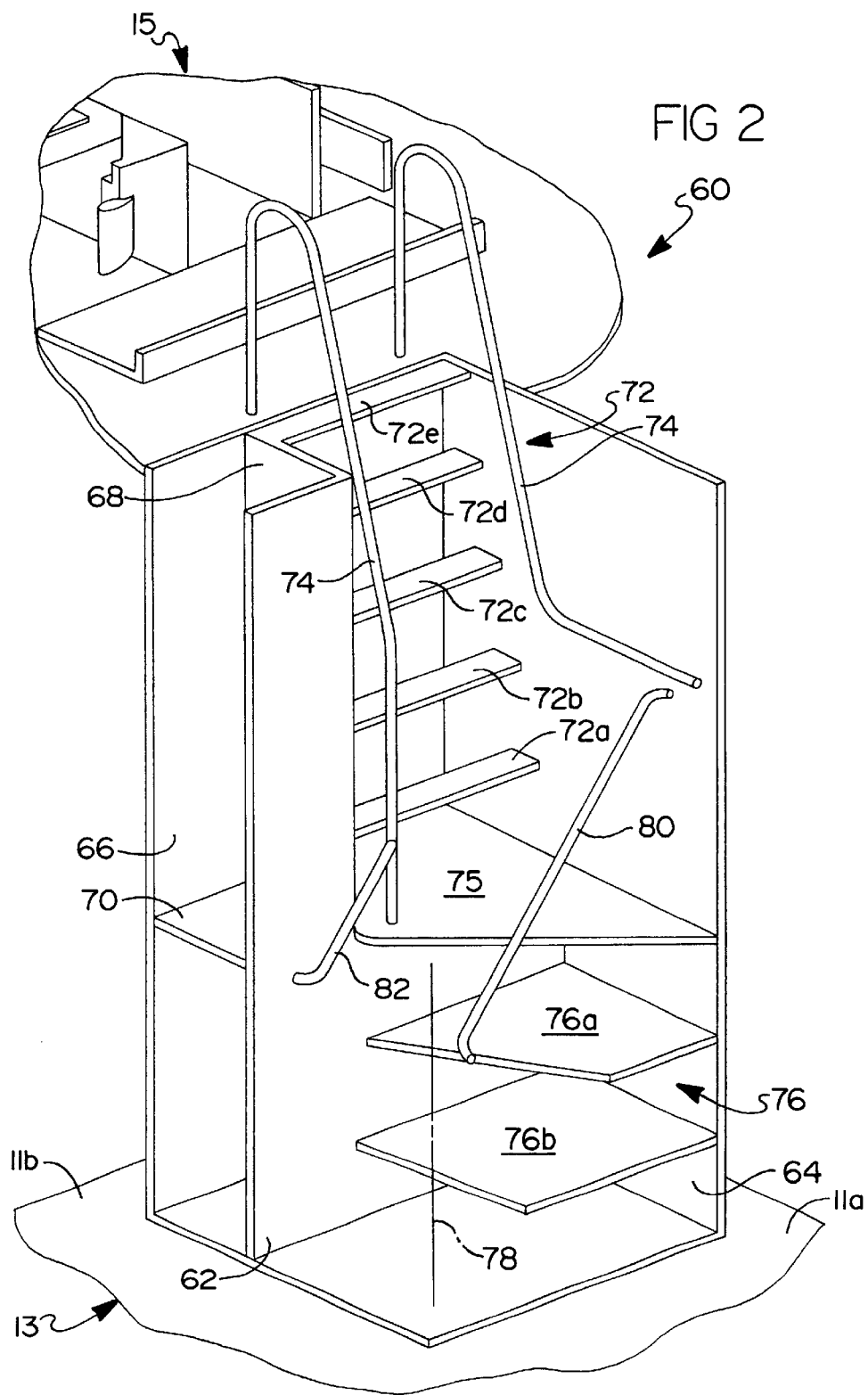
FIG. 2 is a perspective view of a second stairway module in accordance with an alternative preferred embodiment of the present invention wherein both the first and second stairway sections are fixed and form a "spiral" stairway.

Referring now to FIG. 2, a stairway module 60 in accordance with an alternative preferred embodiment of the present invention is shown. Stairway module 60 is similar to module 10 in that it includes wall portions 62, 64, 66 and 68. Wall portions 62, 66 and 68, together with a shelf 70, define upper and lower storage areas for storing various items. An upper stairway section 72 formed by steps 72a, 72b, 72c, 72d and 72e are fixedly supported between wall portions 68 and 64. A pair of hand rails 74 aid the crew member in walking up and down the steps 72a–72e. A mid-level changing deck 75 is also fixedly supported between wall portions 68 and 64 and forms a transition area between the upper stairway section 72 and a lower stairway section 76. Lower stairway section 76 is formed by fixedly mounted stairs 76a and 76b supported by wall portions 62 and 64. In this regard it will be appreciated that one wall, indicated by partial phantom line 78, has been omitted to clearly illustrate the construction of the interior of the module 60, but that the wall 78 will also be used to support the steps 76a and 76b. Similarly, wall 78 is used to support a hand rail 80 for assisting crew members in climbing up and down the steps 76a, 76b. A short handle section 82 secured to one of the two rails 74 and the wall portion 62 further assists a crew member in using the module 60.

Module 60 provides an extremely compact footprint which is no larger than the traditional lavatory module. The module 60 also provides athwartship access to the overhead storage or sleeping area 15 within the fuselage 13.

Referring now to FIG. 3, a stairway module 100 in accordance with an alternative preferred embodiment of the present invention is shown. The stairway module 100 is adapted for fore-to-aft access to an overhead storage or sleeping area 102. Stairway module 100 is adapted to be mounted inbetween two conventional lavatory modules 104 that includes a single stairway section 106. Stairway section 106 is supported pivotally at its upper end 106a such that its lower end 106b can be pulled out, thus placing the stairway section 106 at an incline (i.e., an operable position). When in its retracted position, as indicated by dashed lines 108, the stairway section 106 rests flush against a vertical wall 110 separating the lavatory modules 104. Optionally, some form of locking mechanism could be included at the upper end 106a of the stairway section 106 to make sure that the stairway section cannot be moved out of its operable position without intervention by a crew member. Since the stairway section 106 rests flush against the wall portion 110, this embodiment causes no encroachment into lavatory modules 104.

Referring now to FIG. 4, still another stairway module 200 in accordance with yet another alternative preferred embodiment of the present invention is shown. Stairway module 200 is also adapted for fore-to-aft access by a crew member to an overhead sleeping or storage area 214. However, stairway module 200 includes an upper stairway section 202 and a lower stairway section 204 which reside within an area 208 formed by recesses in each of a pair of conventional lavatory modules 210.

The upper stairway section 202 is fixedly secured either to wall portions 212 of each of the lavatory modules 210 and/or to structure 214a associated with overhead storage area 214. Thus, the upper stairway section 202 is not movable. The lower stairway section 204, however, is pivotally secured at its upper end 204a to the lower end 202b of the upper stairway section 202. When in the operable position, the lower stairway section 204 protrudes outwardly of sidewalls 212 of each lavatory module 210. When in the retracted position (shown in phantom), the lower stairway section 204 resides flush with the wall portions 212 of each lavatory module 210. As with the previously described modules, any form of suitable locking mechanism could readily be included with the lower stairway section 204 such that once it is placed in its operative position it cannot be retracted without a crew member first disengaging the locking mechanism. Module 200 provides the advantage that it's lower stairway section 204 can be retracted completely flush with wall portions 212 of the lavatory modules 210, but does encroach slightly into the interior areas of each of the lavatory modules 210.

Figure 5:
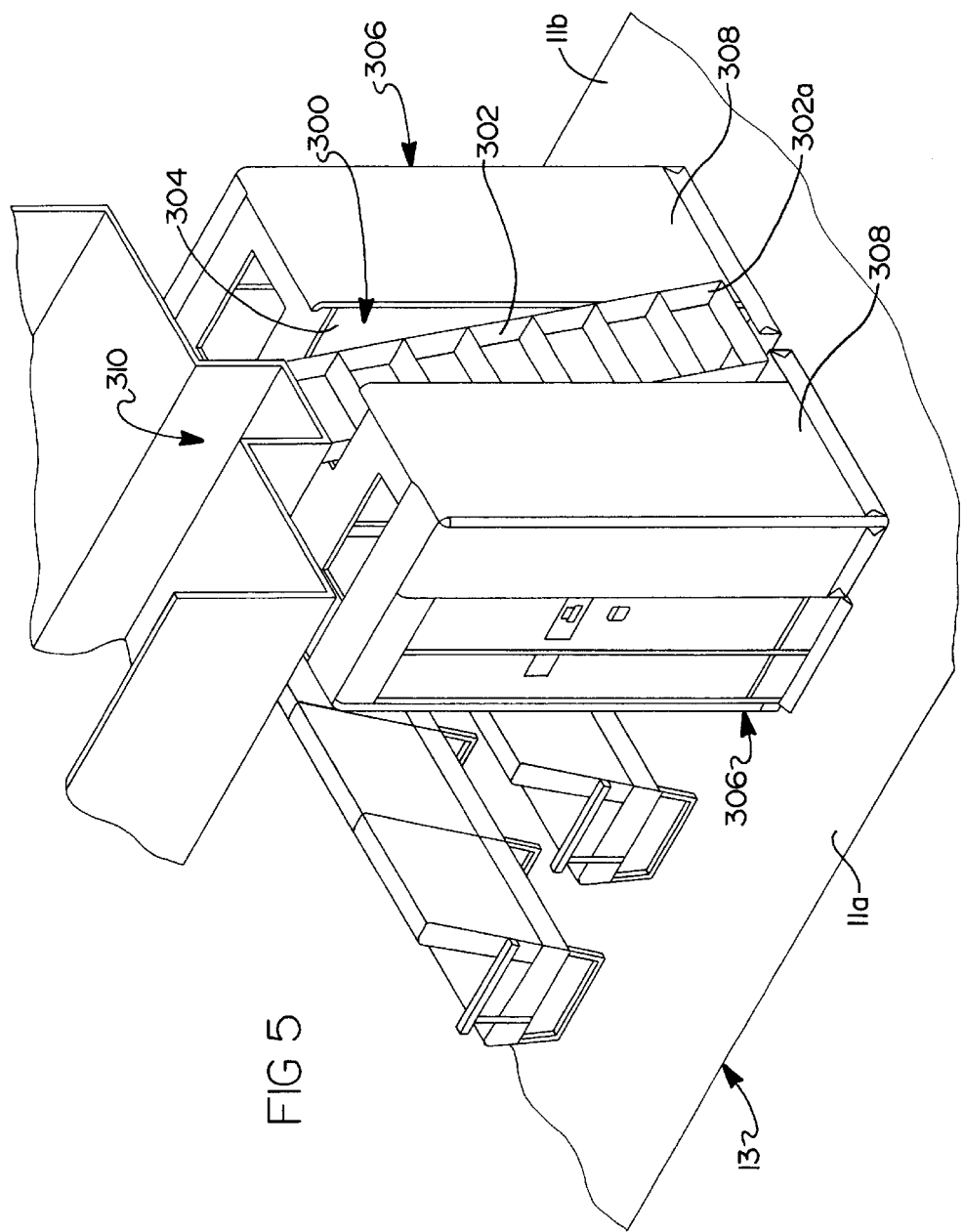
FIG. 5 is a perspective view of a fifth stairway module in accordance with another alternative preferred embodiment of the present invention in which a single stairway section is pivotally secured at its upper end such that the stairway section can be moved between operable and inoperable positions within cooperating recesses created in side-by-side disposed lavatory modules.

Referring now to FIG. 5, a stairway module 300 in accordance with still another alternative preferred embodiment of the present invention is shown. Stairway module 300 is similar to module 200 but instead includes a single stairway section 302 which rests within a cutout 304 formed inbetween two standard lavatory modules 306. The stairway section 302 is further fixedly secured within the area 304 so as to be non-movable and provides access to an overhead sleeping or storage area 310. The securing may be at any portion along the length of the stairway section 302 which holds it securely stationary. The module 300 provides the advantage that even in the operative position shown in FIG. 5, its lower end 302a does not protrude outwardly of wall portions 308 of each of the lavatory modules 306. However, the degree of encroachment into the interior areas of each of the lavatory modules 306 is slightly greater with this embodiment than with the stairway module 200 shown in FIG. 4.

Each of the above-described stairway modules provide a very compact means for accessing overhead storage or sleeping areas within a fuselage of an aircraft. The stairway modules are either easily integrated inbetween conventional lavatory modules, or alternatively form a module having a footprint no greater than a standard lavatory module. The standard lavatory module includes standard dimensions for use in a commercial aircraft that ranges from about 7 to 8 square feet in area. The footprint is a standard footprint with standard dimensions for use in a commercial aircraft that ranges from about 28.5×43.7 to 29.25×41 square inches. In either instance, the stairway modules of the present invention provide for very compact stairways which do not interfere with the aisleways or other areas within a fuselage of an aircraft.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A stairway module for use within a standard footprint of a standard lavatory module in a fuselage of an aircraft to enable access from a floor within said fuselage to an overhead storage or sleeping area within said fuselage, said stairway module comprising:

a plurality of spaced apart vertical wall portions each extending from a bottom portion of said stairway module to a to portion of said stairway module;

an upper stairway section having a plurality of upper steps supported between said vertical wall portions;

a mid-level platform supported between said vertical wall portions below said upper stairway section;

a lower stairway section having a plurality of lower steps supported between said vertical wall portions and disposed below said mid-level platform;

said lower stairway section extending in a direction turned approximately ninety degrees away from said upper stairway section such that said upper and lower stairway sections form a partial, spiral stairway having a footprint substantially equivalent to the standard footprint of a standard lavatory module; and wherein said plurality of lower steps and said plurality of upper steps are each supported from at least one of said plurality of spaced apart vertical wall portions; and wherein said one of said spaced apart vertical wall portions partially encloses said Plurality of lower steps and said plurality of upper steps within said stairway module.

2. The stairway module of claim 1, further including at least one upper hand rail disposed alongside said upper stairway section.

3. The stairway module of claim 1, further including a pair of upper hand rails disposed alongside said upper stairway section on opposite sides of and plurality of upper steps of said upper stairway section.

4. The stairway module of claim 1, further comprising at least one hand rail supported by one of said wall portions alongside said lower stairway section.

5. The stairway module of claim 1, further comprising a pair of hand rails supported by said wall portions and disposed on opposite sides of said lower stairway section.

6. The stairway module of claim 1, further comprising a storage compartment formed in part underneath said mid-level platform.

7. A stairway module for use within a standard footprint of a standard lavatory module in a fuselage of an aircraft to enable access from a floor within said fuselage to an overhead storage or sleeping area within said fuselage, said stairway module comprising:

at least first, second, third, and fourth vertical wall portions each extending from a bottom portion of said stairway module to a tog portion of said stairway module;

an upper stairway section supported between said first and second vertical wall portions;

a mid-level platform supported between said first and second wall portions below said upper stairway section;

a lower stairway section supported between said second and fourth vertical wall portions and disposed below said mid-level platform;

a storage area formed adjacent to said lower stairway section and defined in part by one of said first and second vertical wall portions, in combination with said third vertical wall portion; and said lower stairway section extending in a direction turned away from said upper stairway section such that said upper and lower stairway sections form a partial, spiral stairway having a footprint substantially equivalent to the standard footprint of a standard lavatory module.

8. The stairway module of claim 7, wherein said fourth wall portion partially defines said storage area.

9. The stairway module of claim 7, further comprising an upper hand rail disposed alongside said upper stairway section and supported from one of said first and second wall portions.

10. The stairway module of claim 7, further comprising a lower hand rail disposed adjacent said lower stairway section and supported at least in part by said second wall portion.

11. A compact stairway module for use within a standard footprint of a standard lavatory module in an aircraft to permit access by a crew member to an overhead area within a fuselage of said aircraft, said stairway module comprising:

a frame including a plurality of vertical walls each extending from a bottom portion of said stairway module to a top portion of said stairway module;

an upper stairway supported by said frame;

a lower stairway supported by said frame;

a horizontal platform supported by said frame and disposed intermediate said upper and lower stairways for allowing a crew member to stand thereon and access said overhead area;

said upper and lower stairways providing an athwartship entrance to said overhead area;

a storage area, defined by said plurality of vertical walls and the bottom portion formed adjacent to said lower stairway and said upper stairway, and running beneath said upper stairway; and said stairway module having a footprint substantially equivalent to the standard footprint of a standard lavatory module.

* * * * *